United States Patent [19]

Ogden

[11] 4,277,841

[45] Jul. 7, 1981

[54] ELAPSED TIME INDICATOR

[75] Inventor: Gerald W. Ogden, Elgin, Ill.

[73] Assignee: General Time Corporation, Thomaston, Conn.

[21] Appl. No.: 20,434

[22] Filed: Mar. 14, 1979

[51] Int. Cl.³ ...................... G04B 19/20; G04C 15/00; H02H 37/17

[52] U.S. Cl. ...................................... 368/78; 368/155; 310/49 R

[58] Field of Search .................. 58/16 R, 21.13, 23 R, 58/23 BA, 23 A, 23 D, 38 R, 38 A, 39.5; 235/92 R, 92 B, 92 C, 92 F, 92 G, 92 H, 95, 104; 310/49 R, 156, 49, 159; 340/378.5, 378.6; 368/78, 89, 107, 113

[56] References Cited

U.S. PATENT DOCUMENTS

| | | | |
|---|---|---|---|
| 2,353,670 | 7/1944 | Johnson | 310/156 |
| 3,132,558 | 5/1964 | Wymann | 88/24 |
| 3,370,189 | 2/1968 | Haydon et al. | 310/49 |
| 3,495,107 | 2/1970 | Haydon | 310/49 |
| 3,754,391 | 8/1973 | Fujita | 58/23 R |
| 3,878,414 | 4/1975 | Harakawa | 310/49 R |
| 3,908,353 | 9/1975 | Graziano | 58/125 C |
| 3,978,651 | 9/1976 | Yoshino | 58/23 D |
| 4,004,168 | 1/1977 | Haydon | 310/41 |
| 4,047,375 | 9/1977 | Wulff | 58/23 R |
| 4,088,909 | 5/1978 | Matsumura et al. | 310/49 R |
| 4,162,418 | 7/1979 | Kawaki et al. | 310/49 R |

*Primary Examiner*—Vit W. Miska

*Attorney, Agent, or Firm*—Pennie & Edmonds

[57] ABSTRACT

A stepping motor (44) for use in and in combination with an elapsed time indicator (10) of the type including a plurality of indicator drums (102, 104, 106 and 108) and a drive train (FIG. 3) driven by the motor for driving the indicator drum (102). The motor includes a rotor (56) and a stator providing a pair of stator poles (50, 52) including a notch (94, 96) in respective poles faces. The notch creates a pair of pole faces, one of major length and the other of minor length in each stator pole. In a non-current condition, the rotor seeks a dwell or detent position rotationally toward the pole face of greater concentration of iron. When the winding (54) is pulsed, the rotor, within at least the second pulse, moves unidirectionally and between pulses locates a further dwell or detent position. An indicator (154) including a flag (156) is controlled in movement by the motor so that the flag is moved into and out of a viewing window (40) to indicate motor operation.

4 Claims, 13 Drawing Figures

ELAPSED TIME INDICATOR

TECHNICAL FIELD

The present invention is directed to an elapsed time indicator and to a motor for stepwise drive of a gear train providing an input to the indicator drum of lowest order of a series of indicator drums. The present invention, additionally, is directed to an indicator to afford an indication that the motor is operative.

BACKGROUND ART

Indicators utilizing a plurality of drums carrying indicia for purposes of providing a readout of time are known. Such indicators generally are driven by a synchronous motor coupled either to a seconds wheel or to some other input for driving an indicator drum of lowest order of a series of indicator drums. The input to the indicator drum is through a stepped advance, usually carried out by a Geneva-type mechanism.

Indicators for readout of elapsed time from a somewhat similar plurality of indicator drums are also known; and, the elapsed time indicators have been driven by a synchronous motor powered by either an alternating or a direct current source. In the latter instance, a solid state electronic package has been used for the conversion to alternating current. The conversion was from a low voltage DC current to 400 Hz, 26 volts. Typically, the motor by which the indicator drums of the elapsed time indicator has been powered is of relatively small size, a size which may be likened to that of the common headache remedy pill. These motors suffer from various disadvantages. To this end, the speed of operation of the motor, which in present motors may be about 3,000 RPM, requires special bearings and lubrication, and thus has been found to add unduly to the expense not only in structure but also in the assembly of each unit. Further, because of the speed of the motor, an excessive number of gear passes is required for a gear ratio between the motor and the slowest moving indicator or drum of about two billion to one. Further still, there have been special problems relating to the precision to which the motor must be manufactured. This relates to the hysteresis ring in the motor and also to the positions of the poles which, if not critically located, may result in the motor running backwards, or with less torque than required, or at other than synchronous speed, or a combination thereof.

DISCLOSURE OF THE INVENTION

The present invention is in an improvement of elapsed time indicators and to a novel motor for driving the indicator drums which overcomes the aforementioned problems and disadvantages. The invention, also, is directed to an indicator for use with the motor of the elapsed time indicator to afford visual notification that the motor is operative. Not only does the present invention overcome the mechanical and electromagnetic problems, it also resides in a manufacture which is cheaper in construction and, therefore, competitive in the marketplace The motor includes a magnetized rotor which is magnetically detented by a stator construction and which rotates through one-half turn with each pulse to the field coil of the stator. The rotor is the fastest moving part in the unit; and receiving approximately one pulse per 2.5 seconds, it will rotate at an average rate of approximately 12 revolutions per minute. This will be discussed in detail as the disclosure continues. At this speed, the pivots need only the molded plastic bearings and no lubrication is required. This eliminates problems associated with speed, heat and lubrication.

The stator of the motor is of a construction to provide, in a stepwise advance of the rotor, a detent or null position from which the rotor rotates when an energizing pulse is impressed across the winding. The detent or null position assures that the rotor will rotate in the desired direction, i.e., unidirectional, irrespective of the induced magnetic polarity and without the need of a so-called "no-back" mechanism. To this end, the stator comprises a laminate including a plurality of stator pole lamina at radial spacing around a portion of the rotor circumference. Each pole is notched to present a greater concentration of iron on one side of the notch than the other side. Like portions of the radial stator poles are diametrically opposed and in a non-current condition the magnetic poles of the rotor seek the greatest concentration of iron thereby to advance by a few degrees angularly beyond a position when a current pulse is impressed across the winding. Irrespective of the induced magnetic polarity of the stator poles, the rotor, at least with the second pulse, will move in the desired direction and ultimately seek a second detent position 180° removed from the first. Even though the motor is miniature in size, the tolerances permitted by the stator construction are comparatively wide. The skills required in assembly need not be as great as heretofore required, yet a significantly high percentage of units operate satisfactorily without any final processing.

The indicator is controlled by the motor to pivot about a pivot point into and out of a viewing window. As indicated, the motor is the fastest moving of the movable parts of the elapsed time indicator and is utilized as an input for pivoting the indicator. If the indicator is caused to pivot into and out of the viewing window several times every minute, the viewer will be able readily to determine if the motor is operative.

Other advantages of the present invention will become clear as the description continues.

BEST MODE FOR CARRYING OUT THE INVENTION

The present invention is directed to an elapsed time indicator and to a circuit and a motor pulsed in operation by the circuit whereby a rotor in driving connection with a drive train is advanced stepwise in the drive of an indicator drum carrying indicia of lowest order in a series of indicator drums each carrying indicia of higher order. The invention is also directed to an indicator which functions thereby to afford an indication that the elapsed time indicator is functioning properly.

The elapsed time indicator, identified by the numeral 10 in FIG. 1, includes, as will be more particularly described below, a plurality of indicator drums, a motor and a drive train interconnecting the indicator drum of lowest order and the output of the motor, and a circuit for energizing the motor to advance the indicator drum. The remaining indicator drums are advanced in a conventional manner, as will be described. The constituent parts, among others, are supported by a housing 12 which is received into a casing 14 through an open end and held captive therein by a header 16.

Figure 1:
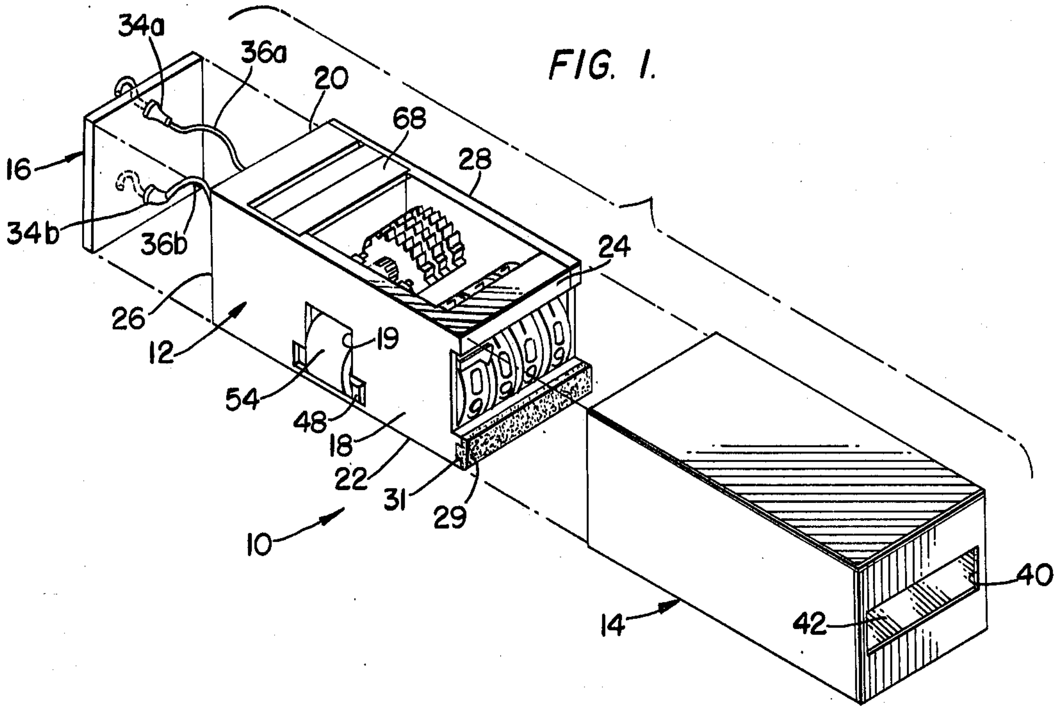
FIG. 1 is an exploded perspective view of the elapsed time indicator of the present invention including a housing for a series of indicator drums, motor, drive train between the output of the motor and the indicator drums and circuitry for development of a pulsed input to the motor, as well as a casing into which the housing is received, and a plate for closing the opening to the casing.
Figure 2:
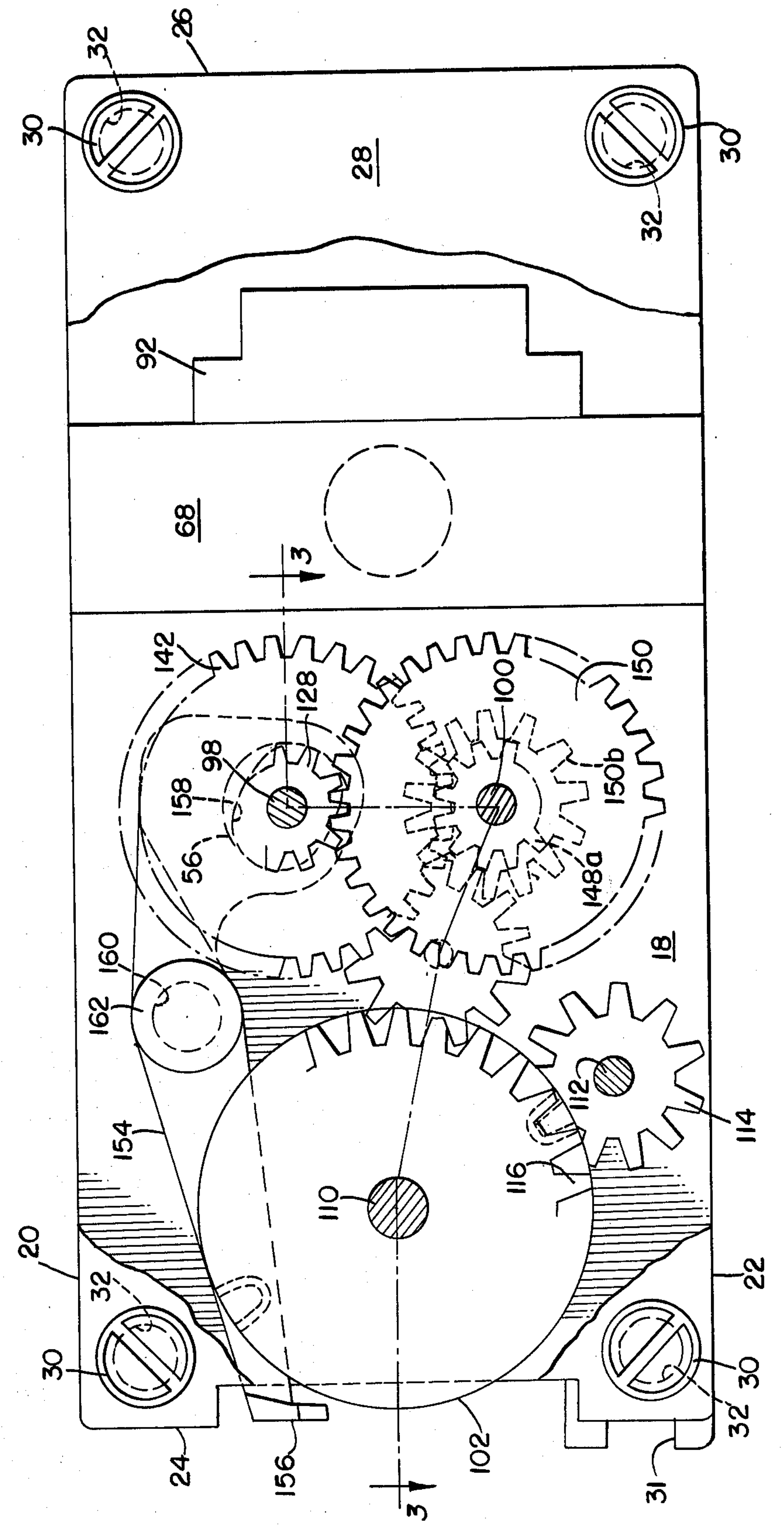
FIG. 2 is a view in elevation of a portion of the drive train for driving the indicator drum carrying units indicia as seen from the right side with a cover to the housing partially broken away.

The housing, as perhaps best illustrated in FIG. 1, is rectangular in cross-section, and includes side wall 18 (the left wall as seen in the Figure), top wall 20, bottom wall 22, front wall 24 and rear wall 26. A cover 28 is received on and secured to portions of the respective walls which are located at the corners and which describe a mounting surface. The cover may be received in any convenient manner, for example, by a plurality of screws 30 (see FIG. 2) threaded into tapped bores 32 located at each of the four corners. The side wall 18 and cover 28 are substantially continuous throughout their surface area; whereas, as illustrated in the several figures, the other walls of the housing generally comprise a surface or frame around the perimeter of a central open area. The discontinuity in the side wall 18 comprises a somewhat T-shaped cutout 19; and both the side wall and cover 28 are provided with a plurality of bores (not shown for clarity) for support of the ends of a plurality of shafts which, in turn, support, for example, the indicator drums, gears and pinions of the drive train and so forth.

As illustrated in FIG. 1, the open end of casing 14 is to the rear (the left side of the Figure). And, the header 16 may be received on and supported by the casing in any convenient manner, such as by means of soldering. The housing 12 preferably is formed of a plastic material and both the casing 14 and header 16 may be formed either of a plastic material or of metal thereby to display characteristics, among others, of impact strength, durability in use, and so forth. In a preferred embodiment, the housing is formed of polyphenylene sulfide plastic; whereas, the casing and header are fabricated of metal, such as brass. A member 29 including a rib therealong and to the rear is carried by a channel 31 in the front wall 24 to immobilize the housing within the casing when the plate is mounted. The member may be formed of neoprene or some similar compressible material.

Figure 5:
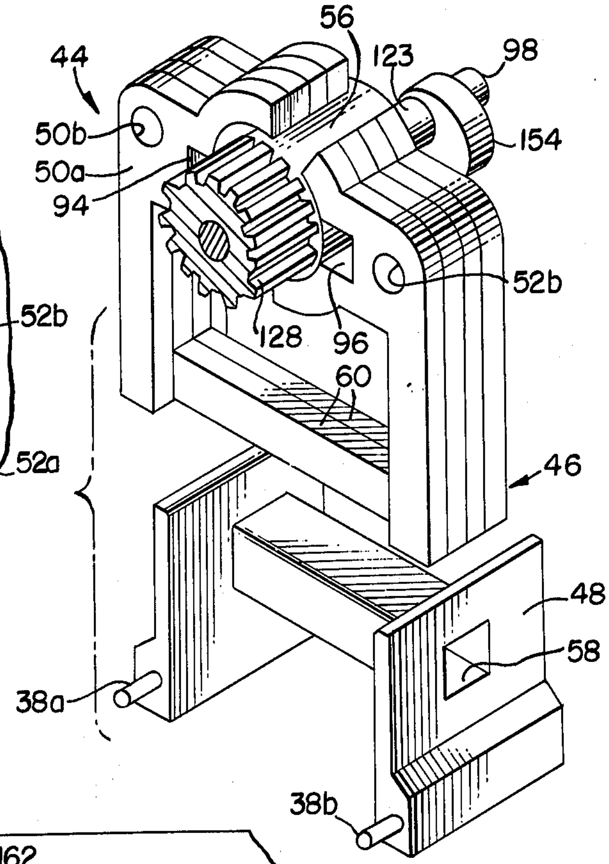
FIG. 5 is a perspective view of the stator including a stack of radially spaced pole pieces and a bobbin including a winding to be supported by a core, the parts in an unassembled condition.

A pair of terminals **34*a*, 34*b* are supported by and extend outwardly of header 16. Conductors 36*a*, 36*b* are connected to respective terminals and to an electronics package. The electronics package, in turn, is connected to terminals 38*a*, 38*b*, supported by the bobbin, thereby to electrically connect opposite ends of the winding to a source of power (see FIG. 5). This will be discussed below. Each of the terminals 34 are electrically isolated from the header 16 by means of a nonconductive glass material or the equivalent. A cutout 40 is formed in the front wall of the casing 14 to serve as a viewing window. A sheet 42** of material, such as glass, plexiglass, or similar transparent material is supported in the cutout and a readout of indicia carried by the indicator drums may be observed.

An important aspect of the elapsed time indicator of the present invention is with regard to the motor 44 as may be seen in some detail in FIGS. 3–7. The motor includes a stator 46 including a bobbin 48 which is supported by the stator poles 50, 52 and winding 54, and a rotor 56. The stator poles are formed by a laminate of stacked lamina comprised conventionally of iron, such as Armco Electromagnet iron which is suitably annealed. The magnet of the rotor is formed of ALNICO #8 and magnetized radially. In the preferred embodiment, the opposite poles are contiguous and extend throughout one-half the circumference of the rotor. The bobbin preferably will be formed of a plastic material, such as that of the housing; whereas, the terminals **38*a*, 38*b* (see FIG. 5**) may be formed of brass, carrying a copper plate under an electrolytic solder plate finish (both of a minimum thickness of 0.0002 inch).

In a preferred embodiment of the present invention, the stator comprises a laminate including four stacked lamina of stator poles 50, 52. The poles are each carried by a leg **50*a*, 52*a*, respectively, which extend from the arrangement of poles illustrated in FIG. 4 in parallel alignment toward bobbin 48. In the preferred embodiment, one leg 50*a* and 52*a* includes a portion which extends laterally from an end to enter into an opening 58 in bobbin 48 thereby to be in juxtaposition to comprise a core 60**.

Without any intent to limit the construction of the stator to a particular dimension, the width of each extension preferably is equal to twice the thickness of the extension so that the two extensions form a core whose cross-section is substantially that of a square, thereby to provide an efficient electromagnetic coupling with the winding 54. This is a feature well known in the art. And, for the sake of symmetry, either the second or third lamina of one pole may be extended laterally with the opposite lamina of the other pole being extended in similar fashion.

Figure 3:
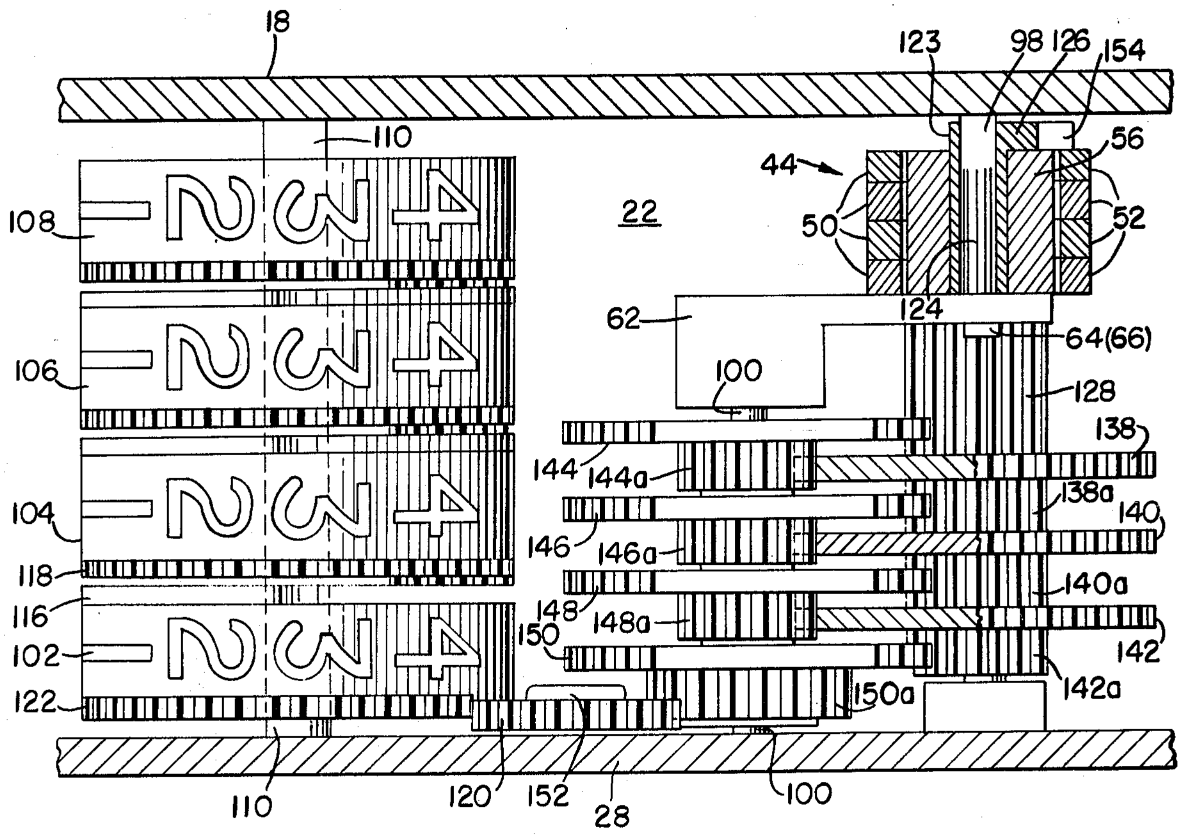
FIG. 3 is a diagrammatic view of the indicator drums and drive train as seen along the line 3—3 in FIG. 2.
Figure 4:
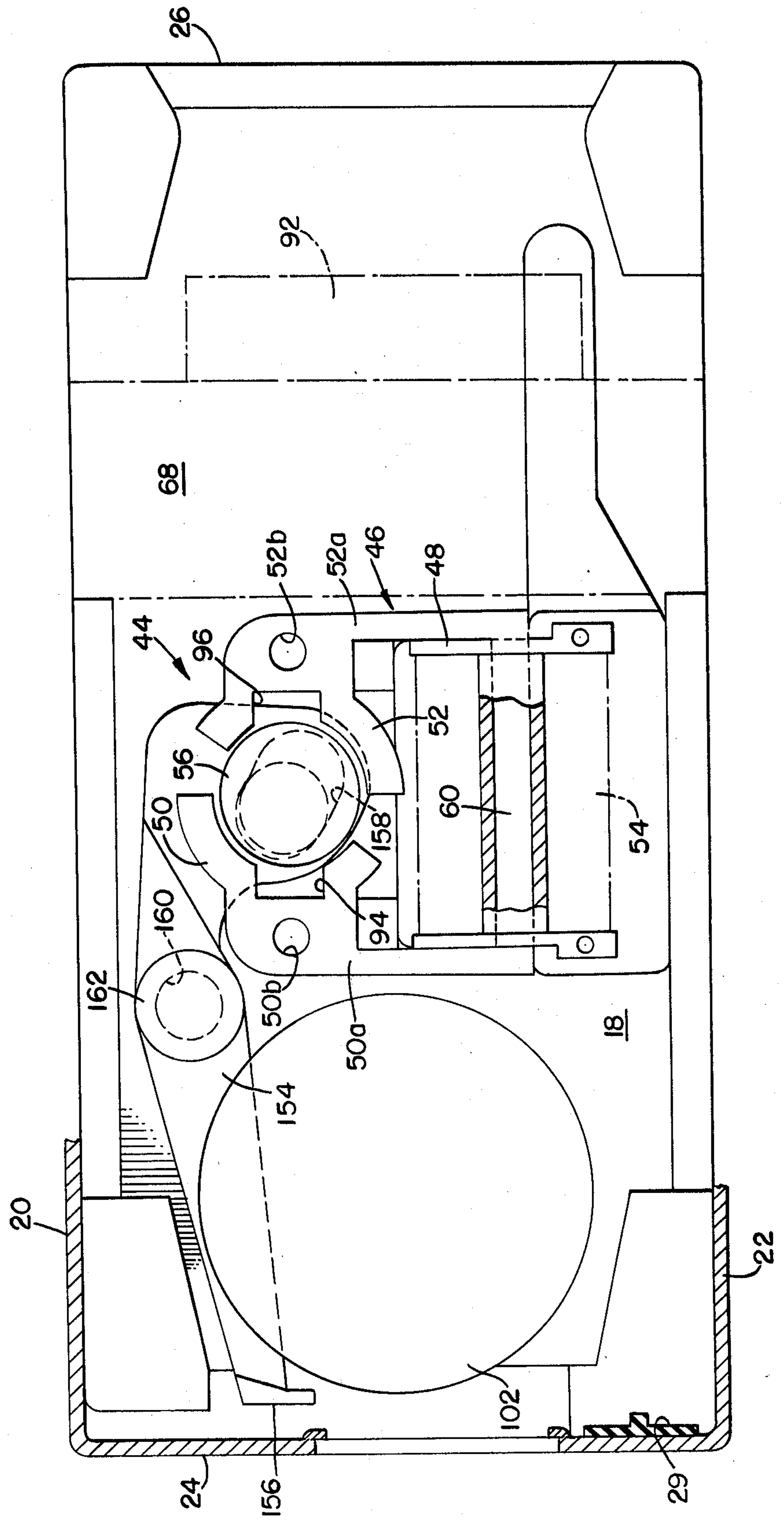
FIG. 4 is a view similar to FIG. 2 illustrating the motor for driving the drive train of the elapsed time indicator.
Figure 8:
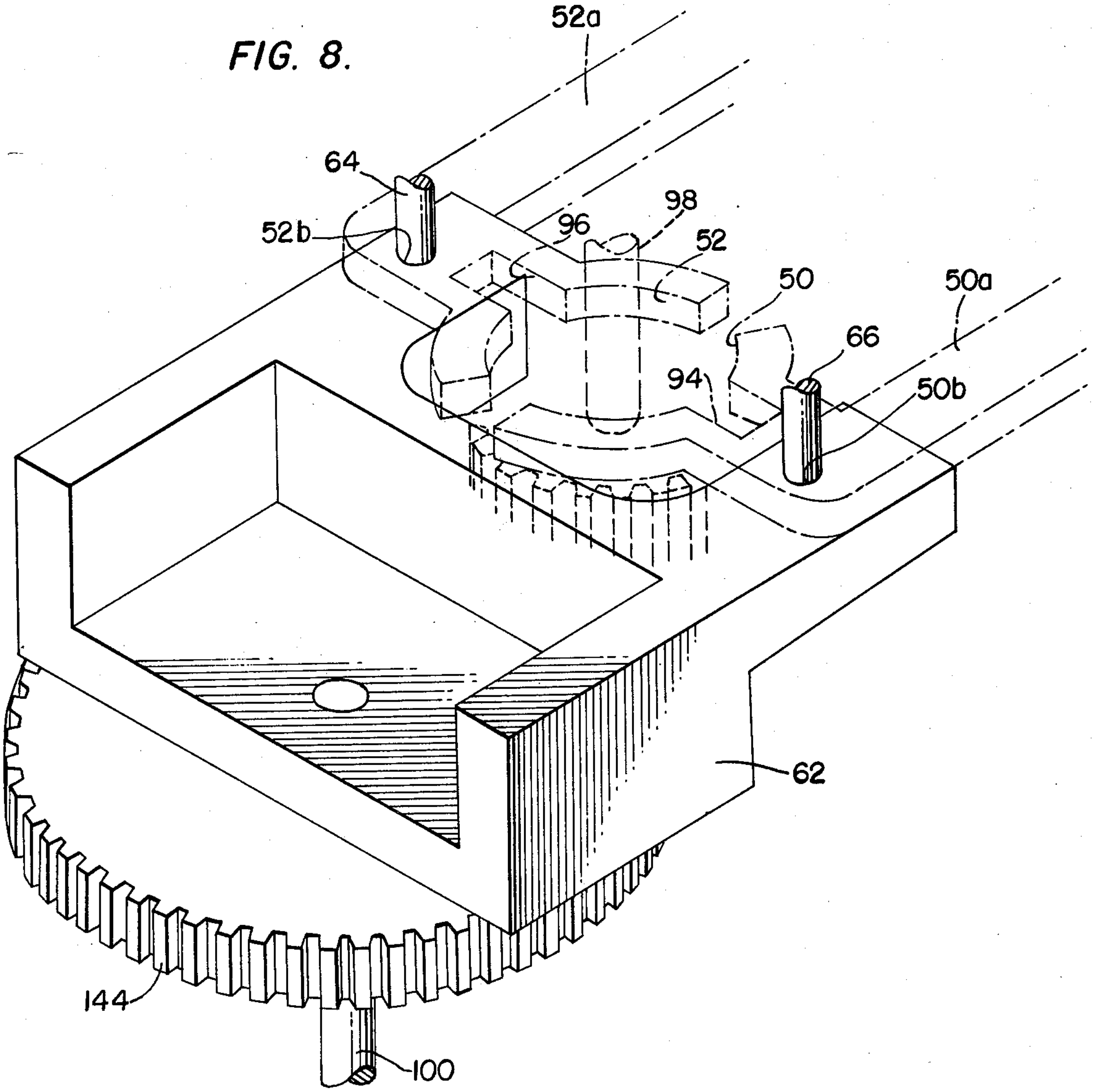
FIG. 8 is a perspective view of a portion of the drive train, supporting shafts and bridge plate.

As may be seen in FIGS. 1 and 4, the bottom lamina forming the two poles of stator 46 is supported on the inner surface of side wall 18, preferably on portions raised somewhat from the plane of the inner surface. A bridge plate 62 (see FIGS. 3 and 8) is juxtaposed to the top lamina for supporting the gear shaft. Any particular structure may be employed to secure the bridge plate, such as the rivets or pins 64, 66 whose head engages with the surface of the bridge plate and whose shank extends through spaced-apart apertures in the bridge plate, apertures 50*b*, 52*b* in the stator poles and into bores in the surface of the side wall 18. Core 60 will immobilize the bobbin 48 when stator 46 is immobilized.

The rotor may be pulsed at any particular frequency and will rotate one-half turn with each pulse to winding 54. In the present embodiment, with an input of approximately one pulse per 2.5 seconds, the rotor will rotate in step fashion at an approximate average speed of 12 revolutions per minute. As such, the rotor is the fastest moving part in the elapsed time indicator. This is an advantage, since at this speed of rotation, there is no need to provide special bearing construction as would normally be required in motors which run at a substantially greater speed of rotation. Further, there is no need for special lubrication and the bearings may be molded plastic.

Figure 9A:
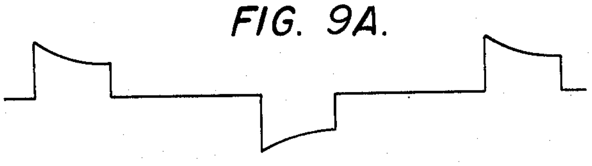
FIG. 9A is a sample pulse sequence developed from the circuit of FIG. 9.
Figure 9:
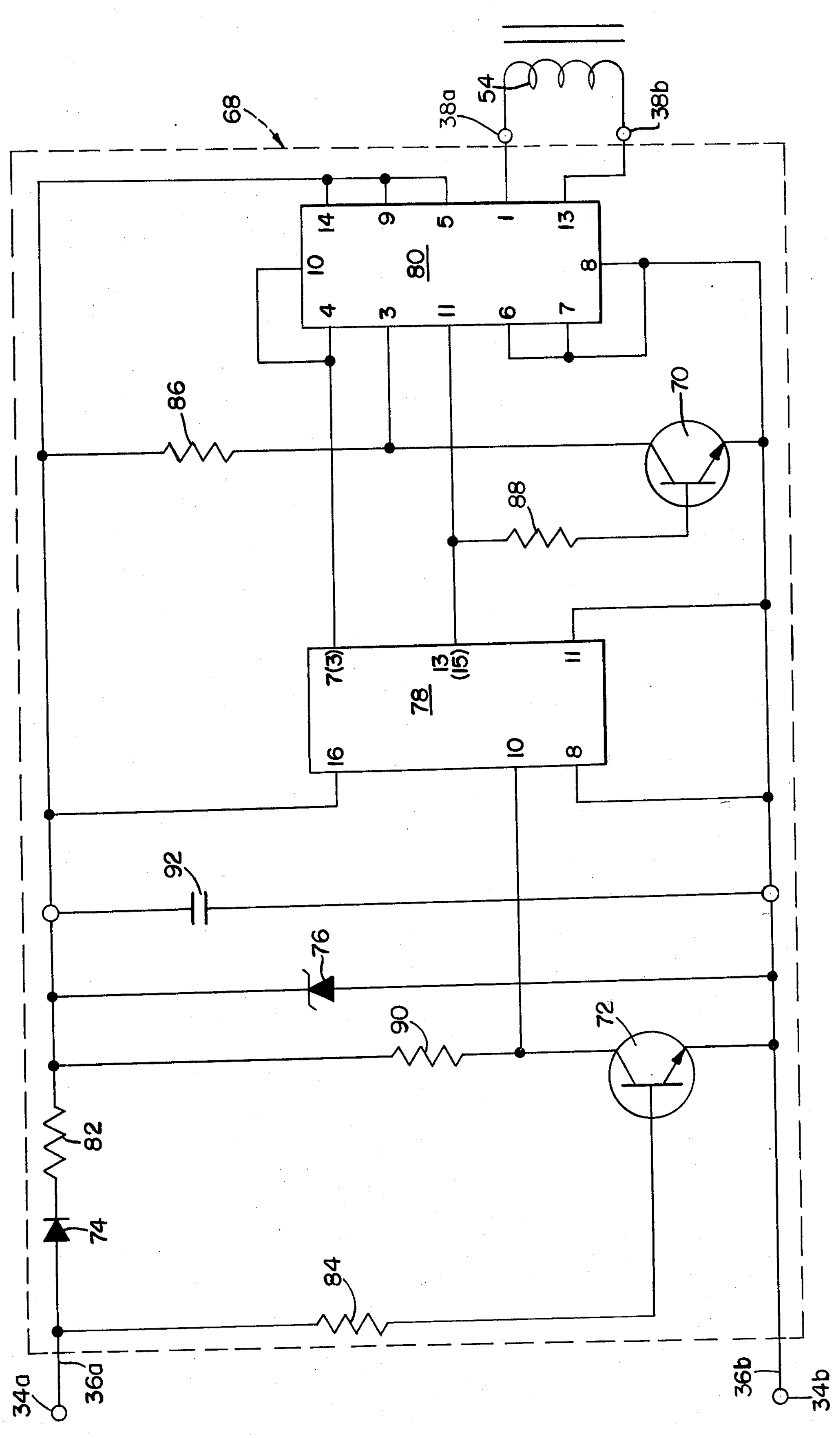
FIG. 9 is a schematic of an A.C. circuit whose pulsed output is connected across the winding of the stator.

A circuit which typically may be used for pulsing the winding 54 may be seen in FIG. 9. The circuit is included in an electronics package 68 supported within housing 12 to the rear of the drive train (see FIG. 1). The circuit is connected to an external source of power which may be the conventional current mains. The connection is at terminals 34*a*, 34*b* and the conductors 36*a*, 36*b* comprise individual busses for the 115 volt, 60 Hz power to the circuit. Within the electronics package, the conductors and the passive resistive elements may be disposed on thereby to be supported by a substrate, in the form of a ceramic plate. The process may be by a silk-screen technique using a conductive, platinum gold ink as is well known; while the other components including transistors 70, 72, diodes 74, 76 and integrated circuits 78, 80 may be supported on the substrate in accordance with any conventional bonding technique. These latter components may be included in the circuit through the use of connectors, in the form of gold wire, and the manner of support may be by a conductive epoxy including silver. The particular function of the circuit is to provide a capability of frequency division of the incoming frequency, as above, as well as other frequencies, such as 400 Hz, to drop the voltage to about 15 volts and shape the output to winding 54. In FIG. 9, the integrated circuit 78, comprising a divider network, is included in the circuit at pins 7, 8, 10, 11, 13 and 16. In the adaptation wherein the divider network functions to divide a 400 Hz input, the circuit connection is at pins 3, 8, 10, 11, 15 and 16.

An input across terminals 34*a*, 34*b* is recitified by diode 74 and transistor 72 is controlled on during the rectified portion of the cycle. Resistor 84 provides a bias voltage to the base of the transistor which is connected across the busses 36*a*, 36*b*. To this end, the collector is connected to bus 36*a* by a limiting resistor 90 and the emitter is connected directly to the bus 36*b*. The zener diode 76 provides for a regulated voltage of about 15 volts which is smoothed by capacitor 92. The output of transistor 72 is connected to pin 10 of the integrated circuit or divide network 78 which divides the incoming frequency by some factor. For example, a frequency of 400 Hz will be divided by a factor $2^{11}$; whereas, if the incoming frequency is 50 Hz, a frequency division of $2^8$ will also suffice, as set out in the following power and gear train combinations:

TABLE OF POWER AND GEAR TRAIN COMBINATIONS

| Input Power | Electronic Divide | Pulse Rate (sec/pulse) | Arc.Ratio Speed(rpm) | Gear Train Reduction (motor to 1st drum) |
|---|---|---|---|---|
| AC 400 Hz | $2^{11}$ | 2.56 | 11.72 | 7031.25 |
| AC 60 Hz | $2^8$ | 2.13 | 14.08 | 8437.5 |
| AC 50 Hz | $2^8$ | 2.56 | 11.72 | 7031.25 |
| DC (51.2 KHz crystal) | $2^{18}$ | 2.56 | 11.72 | 7031.25 |

With reference, again, to FIG. 9, the output of the divide network at pins 7(3), 13 (15) is connected to the integrated circuit or pulse shaper 80 at pins 4 and 11. The pulse shaper is controlled by transistor 70 whose output is connected to pin 3. Transistor 70 is included in the circuit in the manner as transistor 72 and resistors 86 and 88 serve the function of counterpart resistors 84 and 90. The resistor 82 serves as a limiting resistor at the input of the circuit. The pulsed and shaped output of integrated circuit 80 (at pins 1 and 13) is connected to terminals 38*a*, 38*b* supported by bobbin 48. A sample pulse sequence may be seen in FIG. 9A. The winding 54 is illustrated as being connected to the terminals 38*a*, 38*b*, also.

Without any intent to limit the circuit of FIG. 9 to components having values and characteristics as set out below, but rather to describe a preferred embodiment, the following criteria will apply:

Resistor 82: 36 K
Resistor 84, 86, 88: 150 K
Resistor 90: 150 K
Capacitor 92: 6.8μ±20%, 25 volts
Diode 74: 600 volts, 400 ma
Diode 76: Zener, 15 volt±5%
Transistors 70, 72: NPN, 2 N 2222 A
Integrated Circuit 78: CD 4040 BH
Integrated Circuit 80: CD 4013 BH The capacitor 92 is external to the circuit and may be mounted on a rear cover (not seen) of electronics package 68 within which the substrate and the aforementioned components are disposed. The package is illustrated by the dotted line in FIG. 9.

Figure 10A:
FIG. 10A is a sample pulse sequence developed from the circuit of FIG. 10.
Figure 10:
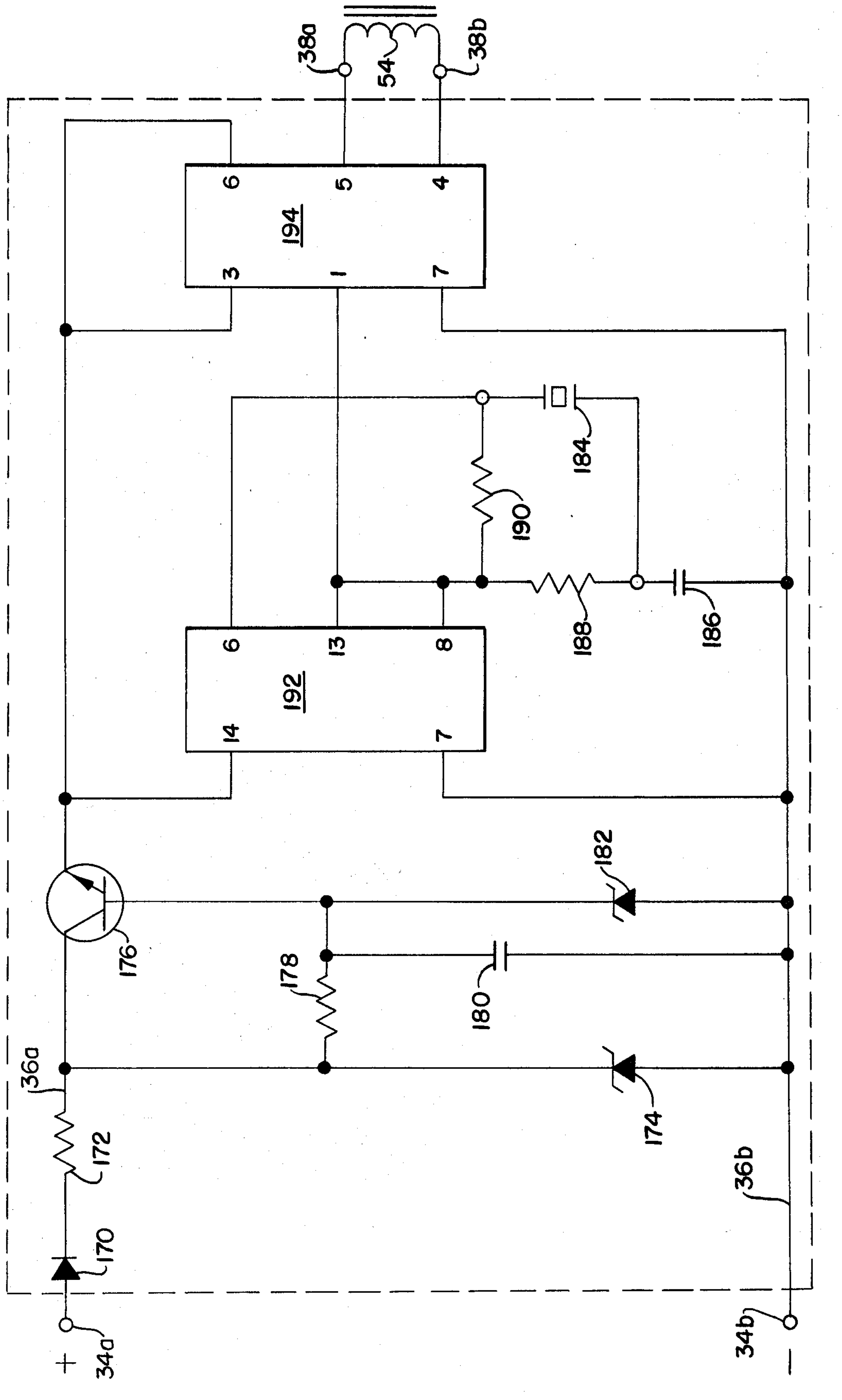
FIG. 10 is a schematic of an alternative D.C. circuit.

Alternatively, the input to the circuit may derive from a crystal, see FIG. 10, having a frequency of 51.2 KHz powered by a voltage (DC) of from about 10 to about 32 volts. In this connection, the circuit will provide a voltage reduction to about 5 volts, a frequency division of $2^{18}$ and the pulse at the output is shaped. With reference to FIG. 10, the input of from 10 to 32 volts DC is connected across the terminals 34*a*, 34*b* of busses 36*a*, 36*b*. A diode 170 at the terminal 34*a* ensures against an improper or faulty connection of the source across the terminals, i.e., the polarity is reversed, causing damage to the circuit. Resistor 172 and diode 174 function to dissipate transients or ripple effect; whereas, transistor 176, resistor 178, capacitor 180 and diode 182 perform the function of voltage reduction and regulation thereby to maintain the voltage to the remainder of the circuit at approximately a level of 5 volts.

Crystal 184, capacitor 186 and resistors 188, 190, in combination with the integrated circuit 192, comprise an oscillator. The integrated circuit 194 provides for both division and shaping of the pulses issuing from the integrated circuit 192. A sample pulse sequence may be seen in FIG. 10A. The output of integrated circuit 194 (at pins 4 and 5) is connected to terminals 38*a*, 38*b* of winding 54 thereby to energize the motor when a proper DC voltage is connected across terminals 34*a*, 34*b*.

Again, without any intent to limit the circuit to components having values and characteristics as are set out below, but rather to describe an alternative preferred embodiment, the following criteria will apply:

Resistor 172: 175 ohms
Resistor 178: 10 K
Resistor 188: 470 K
Resistor 190: 22 M
Capacitor 180: 0.01 $\mu f$
Capacitor 186: 33 pf
Crystal 184: 51.2 KHz
Diode 170: 600 volts, 400 ma
Diode 174: Zener, 36 volts
Diode 182: Zener, 6.2 volts, $\pm 5\%$
Transistor 176: NPN 2N2222A
Integrated Circuit 194: 1CM7051B/D
Integrated Circuit 192: CD 4007 A/H The impedance of the winding 54 in the circuit of FIG. 10 may be 490 ohms; whereas, the impedance of the winding 54 in the circuit of FIG. 9 may be 4.7 K. The crystal 184 is external to the circuit of FIG. 10 and may be mounted and connected to the circuit in the manner described with regard to capacitor 92. The circuit package, again, is illustrated by the dotted line in FIG. 10.

Returning now to FIGS. 4, 5 and 7, it will be seen that the poles 50, 52 of stator 46 are notched at 94, 96, respectively. As may be apparent, the notch 94, 96 and each of the poles of the stator is located in the area wherein the iron otherwise would be continuous along the circumference of rotor 56. And, by the provision of the notch in each pole, it has been possible not only to drive the gear train of an elapsed time indicator but, importantly, to drive the drive train unidirectionally in a stepped manner. The poles of each stator extend throughout an angle of about 145° and each portion on the side of notches 94, 96 having the greatest concentration of iron is disposed diametrically opposite the other. These portions may be characterized as the major pole face. Consequently, the other portions, characterized as the minor pole faces, are disposed diametrically opposite, also. As noted, for example, in FIG. 4 there is a gap between the poles 50, 52 of stator 46, extending throughout an angle of about 35°. And, each notch will include an angular dimension and will be disposed thereby to create, in each stator, a pole portion having a concentration of iron greater than the concentration of iron of the other pole portion. For example, without any intent to limit the invention to specific dimensions, the pole portions of greatest concentration of iron may extend throughout an angle of approximately 65°, the pole portions of smallest concentration of iron may extend throughout an angle of approximately 30°, and the notches 94, 96, having overall substantially a rectangular outline, may be of an angular length of about 50° at the opening.

Figure 7:
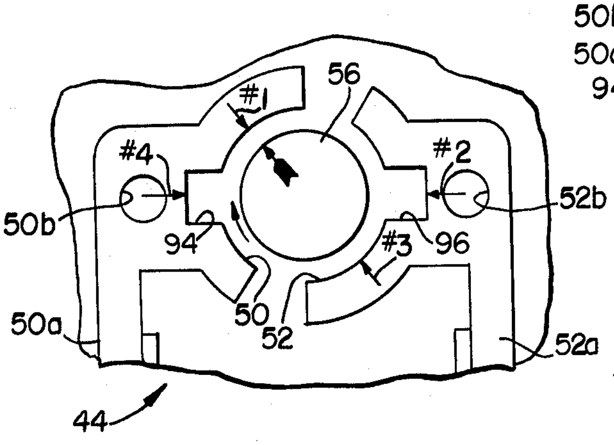
FIG. 7 is a view of a portion of the electromagnetic structure of the motor, the numeric indicia on the stator locating, in order, a position of the rotor relative to the stator, when attracted by a magnetic field, in a position of alignment with the iron of the stator, and so forth.

Referring particularly to FIG. 7, in a no-power condition, i.e., when the winding 54 is not electrically energized, the poles of the rotor magnet will align with the iron of the stator as diagrammatically shown as position No. 1 or position No. 3 and remain detented in that position until an electrical pulse is applied to winding 54. The detent position is the location of the greatest iron concentration as determined by the pole piece configuration and the exact detent position is a function of the last electrical pulse polarity. The following sequence of operation is a continuing process. For explanation purposes, it will be assumed that a starting position commences with a north pole of the rotor magnet at the No. 1 position of FIG. 7:

SEQUENCE OF ROTOR STEPS

1. Absence of electrical power—the north pole of the rotor magnet is detented in arrow position No. 1;
2. Positive pulse applied to winding 54—the north pole of the rotor magnet rotated clockwise to arrow position No. 2;
3. Absence of electrical power—the north pole of the rotor magnet attracted to arrow position No. 3 and, again, magnetically detented;
4. Negative pulse applied to winding 54—the north pole of the rotor magnet rotated clockwise to arrow position No. 4; and,
5. Absence of electrical power—the north pole of the rotor magnet returns to arrow position No. 1.

The sequence of operation is repeated so long as pulses are sequentially applied to winding 54.

Should the initial pulse to winding 54 by negative in character, the rotor will rotate slightly counterclockwise from the detent position of step 1, above, and then settle back to the position illustrated when the initial pulse decays. The second pulse, then, will initiate the sequence of operation discussed above. In accordance with the preferred embodiments of the present invention, the energizing pulses for A.C. operation may be of approximately 30 to 40 milliseconds duration; while the energizing pulses for D.C. operation may be approximately 80 milliseconds duration.

A shaft 98 and a shaft 100 support a plurality of interengaging gears and pinions forming the gear train for driving indicator drum 102, i.e., the indicator drum of lowest order, of the elapsed time indicator. The indicator drum 102, in turn, through a pinion, as will be described, drives indicator drum 104 which drives indicator drum 106 in a like manner. Thus, each of a series of indicator drums 102, 104, 106 and 108 carrying an ordered sequence of indicia may be advanced to permit a readout of elapsed time. A shaft 110 supports each of the indicator drums for rotation. The shaft is received frictionally in a pair of bores in side wall 18 and cover 28. A second shaft 112, likewise received by the side wall and cover and disposed parallel to the shaft 110, supports a plurality of pinions, only the pinion 114 being illustrated in FIG. 2. The pinion 114, as all the pinions, cooperates between adjacent pairs of indicator drums, such as indicator drums 102 and 104, to interact with a mutilated gear 116 carried by indicator drum 102 and a ring gear 118 carried by indicator drum 104. The teeth of the pinion span the gears so that upon each full rotation of indicator drum 102 the mutilated gear will jog pinion 114 through a step advance sufficient to similarly advance indicator drum 104 and change the numeric indicia presentation at the viewing window 40. The indicator drums 102, 104 and 106 are formed in like manner to include both a ring gear and a mutilated gear, while the indicator drum 108 includes only a ring gear. This manner of drive is well known.

A gear 120 comprises the final gear of the gear train and is in driving engagement with ring gear 122 on indicator drum 102 for driving the indicator drum at a speed of 1/10 revolution per hour. The elapsed time indicator, accordingly, will provide an indication of hours, and in a four-indicator drum embodiment, a reading of 9999 hours may be viewed before the elapsed time indicator shall recycle.

The shafts 98 and 100 are supported at one end in a pair of bores (not shown) in cover 28. The shaft 98 extends between the cover and the side wall 18. The other end of shaft 98 is supported within a bore (also not shown) in the side wall. The shaft 100 extends only partially toward the side wall and is supported within a bore (not shown) formed in bridge plate 62. The shaft 98 comprises the rotor shaft and is capable of movement rotationally. A sleeve 123 is fixed on the shaft along a length extending from a point adjacent the bearing support in side wall 18. The sleeve may be fixed on the shaft through any particular structure as by means of a plurality of knurls 124 formed longitudinally of the shaft along its outer surface to provide a tight, immovable (both axially and rotationally) fit. An eccentric plate 126 either is carried by or integral with the sleeve at the end adjacent side wall 18. The purpose of the eccentric plate will become clear as the description continues. A pinion 128 at the output of motor 44 is carried by the sleeve and the rotor 56 is disposed on the sleeve between the eccentric and output pinion. The rotor is fixed axially by the eccentric and a shoulder (not shown) on the sleeve 123 and a friction fit will serve as a means for conjoint movement of shaft 98, sleeve and rotor. The output pinion 128 is formed with an inner diameter substantially equal to the outer diameter of the sleeve thereby to provide a friction fit and movement of the output pinion imparted by the rotor as heretofore described. The shafts 98, 100 may be formed of steel, SAE 1090–1095 having a Rockwell hardness of from about 50–60 (C scale) and the sleeve, which in the preferred form is integral with the eccentric plate, is formed of a plastics material, such as polyphenylene sulfide. The pinion 128 as the unitary gear and pinion assemblies to be described similarly are formed of the same material.

With continued reference to FIG. 3, a series of gear and pinion assemblies are diagrammatically illustrated in stacked relation on shaft 98 and a further series of gear and pinion assemblies are illustrated in stacked relation on shaft 100. To this end, the gears 138, 140 and 142 (with pinions 138*a*, 140*a* and 142*a*) are stacked on shaft 98 and the gears 144, 146, 148 and 150 (with pinions 144*a*, 146*a*, 148*a* and 150*a*) are stacked on shaft 100. As may be apparent from the figure, the drive to the gear train is by way of movement of output pinion 128 in meshing engagement with gear 144 while gear 138 is in meshing engagement with pinion 144*a*, and so on, whereby gear 150 is driven by pinion 142*a*. Gear 120 supported by rivet 152 which is frictionally received in a bore in cover 28 couples the drive of pinion 150*a* to ring gear 122 formed on indicator drum 102. The rivet 152 as well as the rivets 64 and 66 which likewise are received in bores in the side wall 18 or cover 28 are received frictionally to withstand a push-off force of one-half pound. The rivets may be formed of steel, leaded screw stock with a nickel-plate finish thereby, in the case of rivet 152, to permit free movement of pinion 120 under control of the drive train. The plating may have a maximum thickness of about 0.0001 inch.

From the above discussion, it is quite apparent that the movement of the indicator drums of the elapsed time indicator is almost imperceptible. Therefore, it is contemplated to incorporate an indicator arm 154 having capability of movement into and out of the viewing window formed by cutout 40 so that an observer will know that the motor is in operation. Thus, the indicator arm will be visible intermittently during a period of about two and one-half seconds and then hidden from view for a like period of time.

Figure 6A:
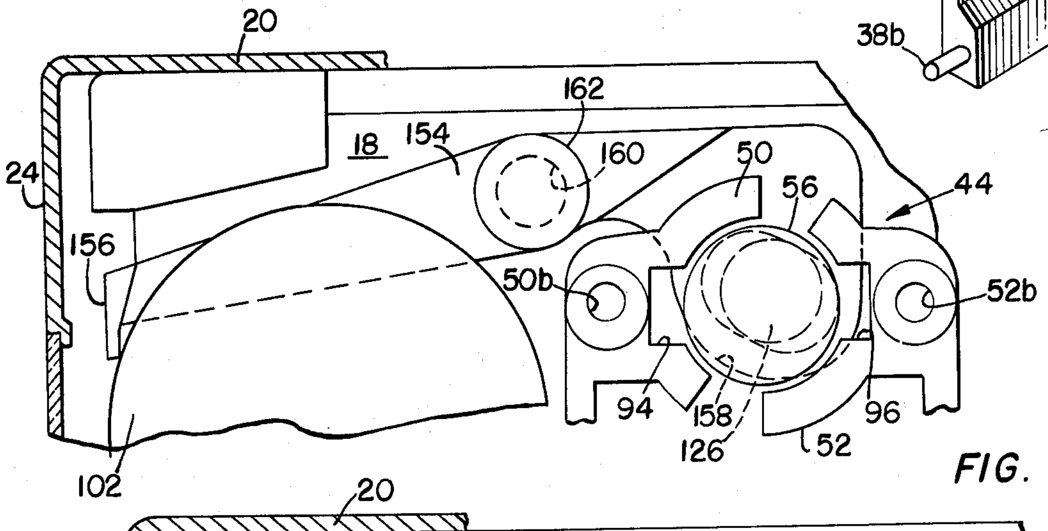
FIGS. 6A and 6B are views in elevation of an indicator disposed in a position to be seen through a viewing window in the casing and in an elevated position, respectively, so that it may not be seen through the viewing window.
Figure 6B:
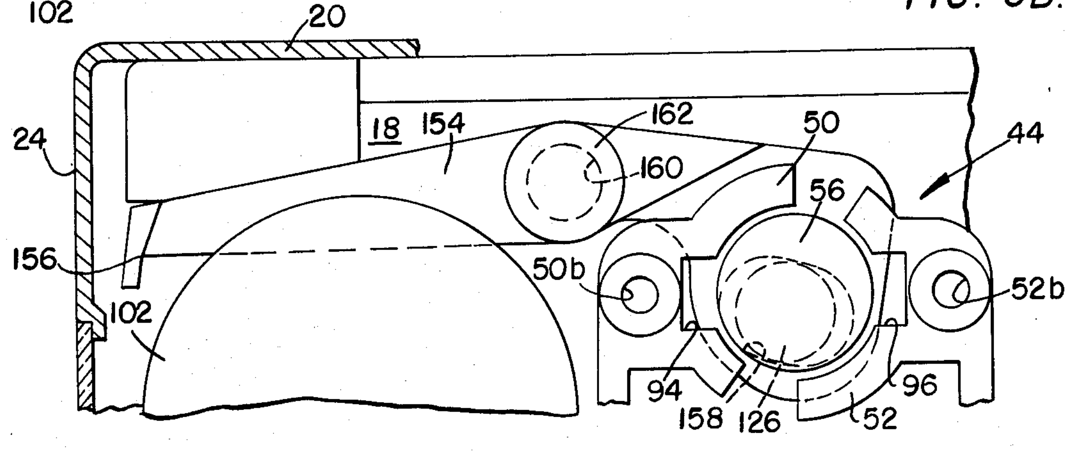

Referring now to FIGS. 4, 6A and 6B, the indicator arm 154 is illustrated as being formed with an elongated frontwardly directed (to the left in the figures) arm terminating in a flag 156. The other end of the arm is formed to a generally rounded planar portion including a cutout 158 of oval outline. The indicator is mounted intermediate its ends for pivotal movement so that the flag is movable into and out of the viewing window.

The indicator includes a bore 160 for receipt on a hub (not shown) either supported on or comprising an integral portion of side wall 18. The hub preferably includes a shoulder spaced slightly from the plane of the inner surface to assure that the indicator is spaced from the surface whereby freedom of controlled motion is obtained. The indicator arm 154 is secured in position by a rivet 162 in frictional engagement in a bore through the hub. As with the rivet 152, etc., the frictional engagement must be sufficient to withstand a push-off test of one-half pound force. If the hub extends from the shoulder throughout a length slightly greater than the thickness of the indicator arm, the head of rivet 162 will engage the hub and not impede the controlled movement to be described. The rivet 162 is formed to be similar to those previously discussed. And, the indicator arm is formed of the same material as the other plastic parts.

The center of cutout 158 in the planar portion of indicator arm 154 is concentric with the axis of shaft 98 in one of two angular positions of the shaft (see FIG. 4). The other angular position is 180° removed. In FIG. 4, the indicator arm is in a center position and as the shaft rotates, clockwise in the figures, the indicator will pivot counterclockwise to the FIG. 6A position, return to the center position and then pivot clockwise to the FIG. 6B position. Movement from a center position in either direction may be through an angle of about 5°.

As previously discussed, the shaft 98 and eccentric plate 126 move conjointly under control of rotor 56. Thus, in rotational movement to the FIG. 6A position, the eccentric plate 126 which is disposed in cutout 158 contacts the wall along its major dimension and the indicator arm pivots counterclockwise. Continued rotational movement to the FIG. 6B position results in movement of the eccentric plate along the opposite wall. The indicator arm, thus, pivots in the clockwise direction, and flag 156 relocates out of the viewing window. This movement of the indicator arm continues under control of the motor, whose rotor is the fastest moving part of the elapsed time indicator.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. A stepping motor for an elapsed time indicator comprising:

(a) a rotor having two magnetic poles of alternate opposite polarity in contiguous arrangement therearound;

(b) a stator having a single pair of stator poles, and a winding adapted to be energized by current pulses occurring periodically for polarizing said stator poles in opposite polarity to each other during substantially the duration of each said pulse, said stator poles being arranged to provide a radial air gap within which said rotor moves and each said stator pole having a face along said air gap adjacent said rotor, said face including a notch forming on each side along said air gap a major and a minor pole face, said stator poles being spaced apart through an arc whose length is about equal to the length of arc of said minor pole face, and each said major and minor pole faces of each stator pole extending throughout an arcuate length less than the arcuate length of the rotor poles and disposed diametrically opposite a like pole face of the other stator pole whereby said rotor aligns substantially with a stator pole during the period of an energizing pulse and within the period between energizing pulses said rotor seeks a detent position rotationally removed therefrom to align substantially with one of said major pole faces; and (c) means for supporting said rotor for rotation within said gap relative to said stator poles.

2. In combination:

(a) a housing, (b) a plurality of indicator drums, each indicator drum carrying indicia in an ordered sequence for readout of time in a selected unit;

(c) first drive means for driving advance of the indicator drum carrying indicia of lowest order;

(d) second drive means interconnecting adjacent indicator drums for incremental driving advance of an indicator drum of higher order by an indicator drum of lower order;

(e) a motor for driving said first drive means in stepped fashion, said motor including (1) a rotor having two magnetic poles of alternate opposite polarity in contiguous arrangement therearound, and (2) a stator having a single pair of stator poles, and a winding adapted to be energized by current pulses occurring periodically for polarizing said stator poles in opposite polarity to each other during substantially the duration of each said pulse thereby to drive said rotor, said stator poles being arranged to provide a radial air gap within which said rotor moves and each said stator pole having a face along said air gap adjacent said rotor, said face including a notch forming on each side along said air gap a major and a minor pole face, each said major and minor pole faces of each stator pole extending throughout an arcuate length less than the arcuate length of the rotor poles and disposed diametrically opposite a like pole face of the other stator pole whereby said rotor aligns substantially with a stator pole during the period of an energizing pulse and within the period between energizing pulses said rotor seeks a detent position rotationally removed therefrom to align substantially with one of said major pole faces; and (f) means for supporting each of said indicator drums, first and second drive means, and motor in said housing whereby a reading may be obtained from said indicator drums, as advanced.

3. The combination of claim 2 including an indicator, a viewing window in said housing, and means for mounting said indicator so that it is moved periodically into and out of said viewing window under control of said motor.

4. The combination of claim 3 wherein said supporting means includes a rotor shaft, a plate movable rotationally with and mounted eccentrically on said rotor shaft, and said indicator including an elongated arm, said arm supported between its ends for pivotal movement, and one end of said arm acted upon by said plate so that the eccentric mounting causes said arm to pivot whereby a flag at the other end is visible in said viewing window.

* * * * *